G. DOFLER.
Bee Hive.
No. 2,986.
Patented March 4, 1843.
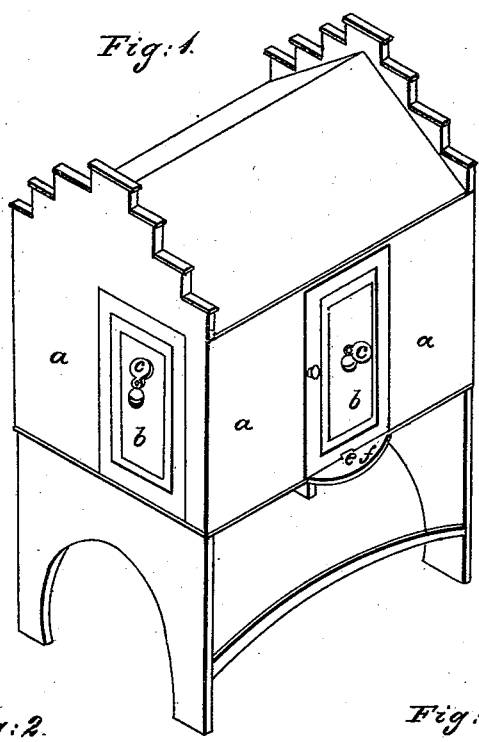
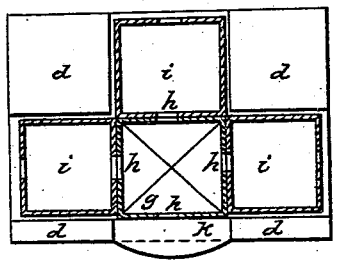
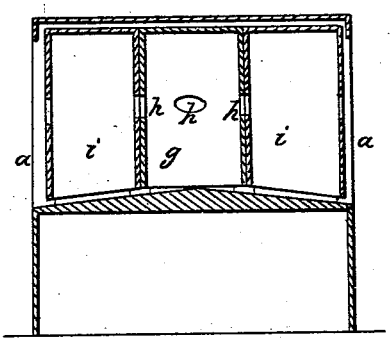

UNITED STATES PATENT OFFICE.

GEO. DOFLER, OF FREDERICK, MARYLAND.

BEEHIVE.

Specification of Letters Patent No. 2,986, dated March 4, 1843.

*To all whom it may concern:*

Be it known that I, GEORGE DOFLER, of Frederick, in the county of Frederick and State of Maryland, have invented a new and Improved Bee-House; and I do hereby declare that the following is a full, clear, and exact description thereof, reference being had to the accompanying drawing, making a part of this specification, in which—

Figure 1 is an isometrical projection. Fig. 2, a horizontal plan. Fig. 3, longitudinal vertical section.

The nature of my invention consists in forming a bee house in which hives or boxes are placed which are insulated therefrom by means of iron wires that form legs on which they stand, the bottom of the house is of a pyramidal form so as to be easily kept clean by the bees.

In constructing my improvement an oblong or cubical box (*a*) is formed the bottom of which rises up in a pyramid on the inside; on each of the four sides there is a door (*b*) in the center of which a round hole is cut and a glass inserted this glass is covered by a turning shutter (*c*) the four corners of the hive are boxed in at (*d*) the partitions coming out flush with the doors; the front door has an aperture under it at (*e*) for the bees to enter, and there is a lighting board (*f*) before it, for the bees to light on, this house is placed on a proper stand, and is roofed so as to shed water.

In the house constructed as above described a square bottomless box (*g*) is placed directly over the apex of the pyramid; this stands on four legs of iron wire and is entirely insulated from the house it has four holes (*h*) in its sides on a line with those above named in the doors of the house, the hole fronting the entrance door is glazed, the others are left open; at the back and two sides of the center box, are placed three others (*i*) of a suitable size to nearly fill the space between the center box and the door, leaving just sufficient span around the outside for the bees to pass all around between the boxes and house; they have holes in them, to range with those in the door and center box, against which they closely fit, the holes next the doors are all glazed, the center ones open a free communication from one to another, and the bees have ready access under the bottom to them all. The span (*k*) between the front door and the box (*g*) is the only place in the house left large enough for the bees to build in which they will sometimes do when they have filled the hives. If the house should be attacked with the bee moth, the worms from the eggs which are laid around the sides of it, cannot get into the hives, but will, if there is comb in front, center in that, and can thus be easily removed.

What I claim as my invention and desire to secure by Letters Patent is—

The combination of the bee house with a pyramidal bottom, with the insulated hives constructed and arranged, in the manner, and for the purpose herein set forth.

GEORGE DOFLER.

Witnesses:
J. J. GREENOUGH,
ARTHUR L. MCINTIRE.